Nov. 23, 1954   H. I. OSHRY   2,695,239
BARIUM TITANATE CAPACITORS
Filed May 3, 1951   4 Sheets-Sheet 2

Inventor
Howard I. Oshry
By Ralph Hammar, Attorney

Nov. 23, 1954  H. I. OSHRY  2,695,239
BARIUM TITANATE CAPACITORS
Filed May 3, 1951  4 Sheets-Sheet 4

Inventor
Howard I. Oshry
By Ralph Hammar
Attorney

United States Patent Office 2,695,239
Patented Nov. 23, 1954

2,695,239

BARIUM TITANATE CAPACITORS

Howard I. Oshry, Erie, Pa., assignor to Erie Resistor Corporation, Erie, Pa., a corporation of Pennsylvania Application May 3, 1951, Serial No. 224,389

11 Claims. (Cl. 106—39)

Barium titanate capacitors exhibit a marked variation in capacity with temperature. This invention is intended to reduce such variation in capacity so that in a preferred form the capacity can be essentially flat (e. g. ±5%) over the range minus 60° C. to plus 135° C. This result is accomplished by introducing foreign ions into the crystal lattice of barium titanate which is prepared in such a manner that the crystal structure at room temperature is essentially cubic as disclosed by X-ray diffraction methods. These amounts are small enough so that the high permittivity of barium titanate is not lost by dilution. These small additions added to barium titanate of cubic crystal form prevent the crystal changes which give rise to the rapid change of polarizability with temperature below the Curie point. This result cannot be accomplished by additions to commercially available barium titanate which by its method of preparation is formed in tetragonal crystals at room temperature, but is limited to barium titanate which is prepared in such a manner that the crystal structure as determined by current X-ray diffraction techniques appears essentially cubic at room temperature. The ions are conveniently added in the form of oxides, but can be added in any form which breaks down at the firing temperature in the region of 1350° C. Oxygen required by the introduction of the ions into the barium titanate crystal lattice is obtained from the atmosphere of the kiln. These ions should preferably come from the class of materials whose bivalent ionic radii are in the range from 0.6 to 1.0 Angstrom unit and whose bivalent ionic potentials are in the range from 1.4 to 1.8. (These values are obtained from the calculations of G. H. Cartledge, Studies on the Periodic System, Journal of the American Chemical Society, vol. 50, page 2855, 1928.) Materials which fall in this class are iron, nickel, cobalt, magnesium, calcium, manganese. Of these materials, iron and nickel are of the greatest value, but the scope of the invention is not limited to these.

Iron is used as an example in the specification, but similar results are obtained with other materials.

Figure 1:
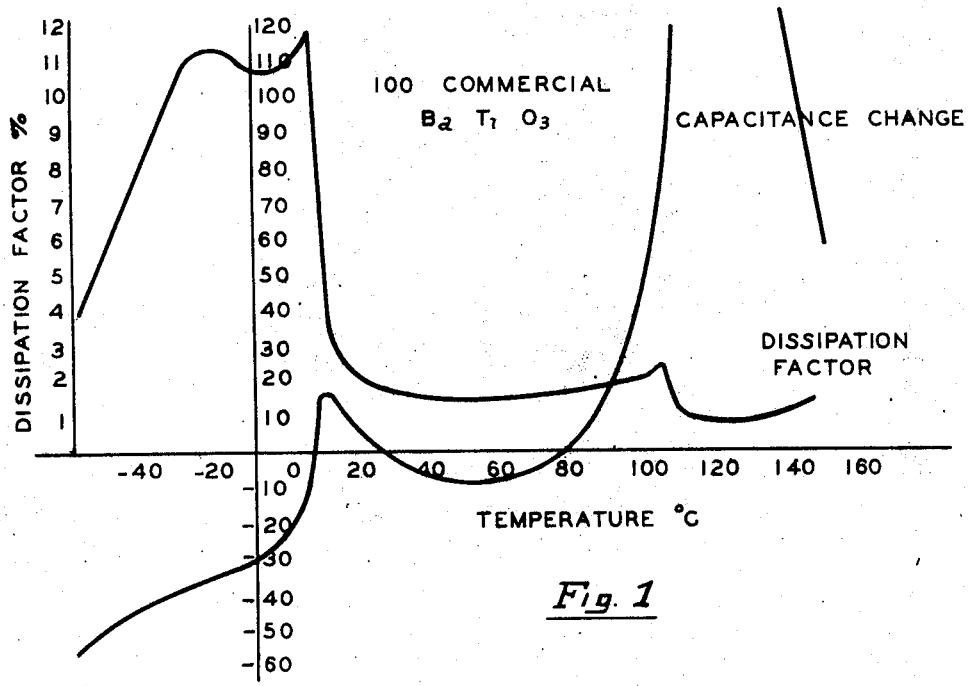
Figure 2:
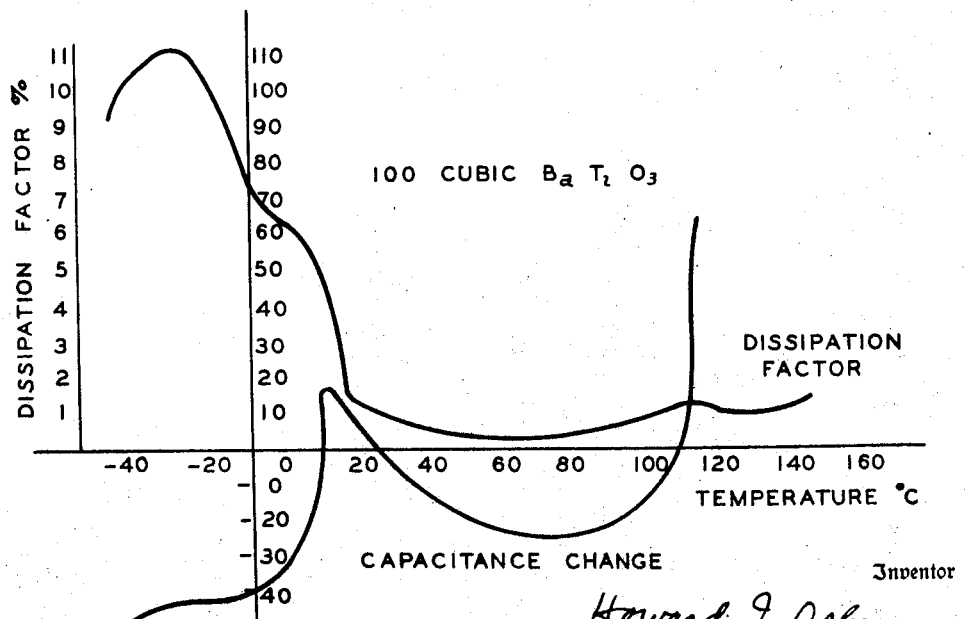
Figure 3:
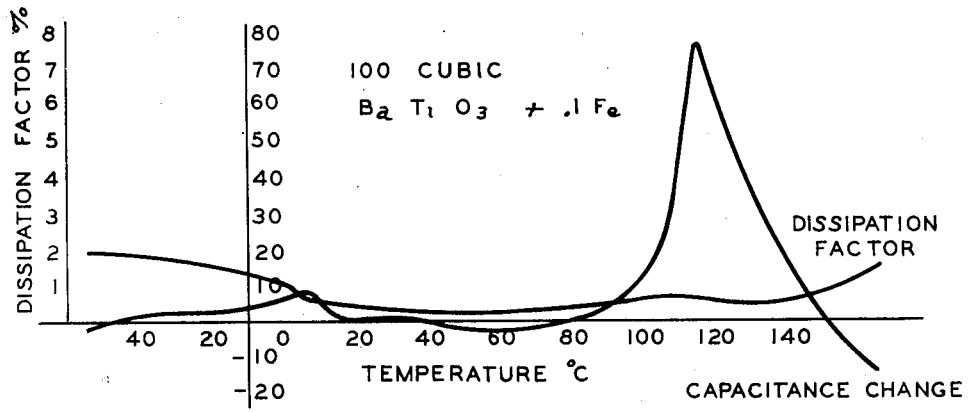
Figure 4:
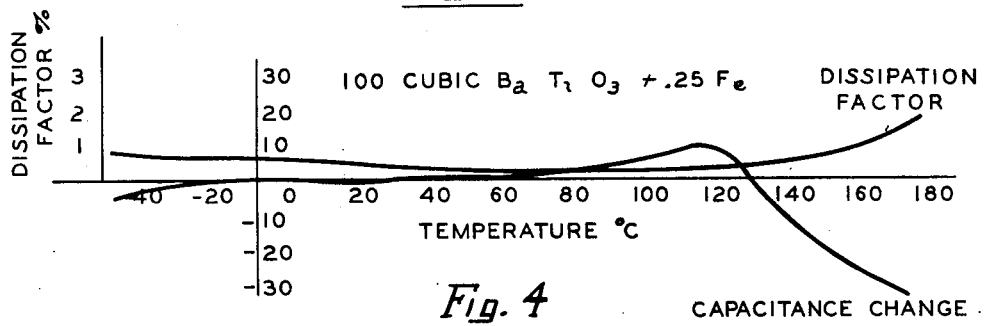
Figure 5:
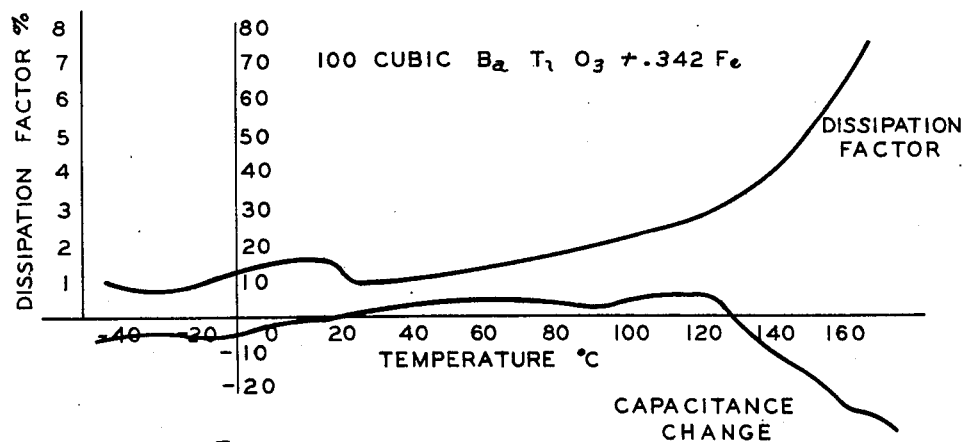
Figure 6:
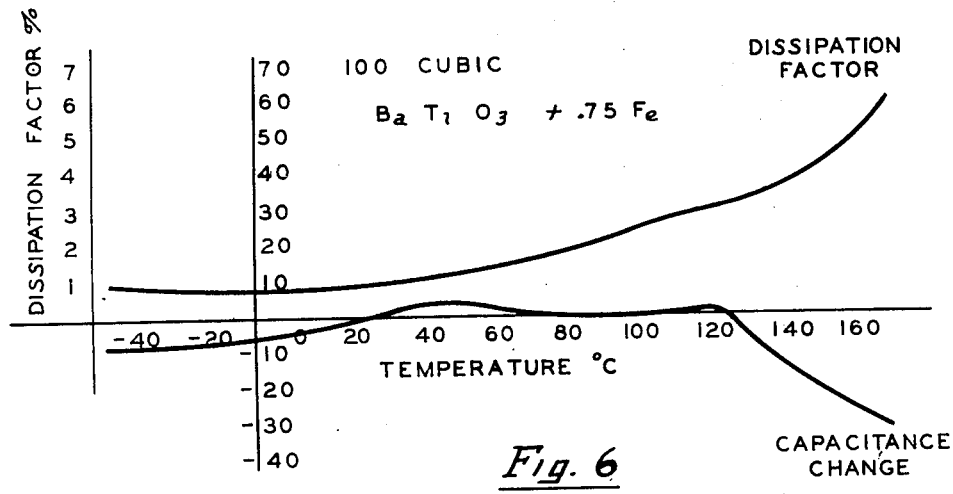
Figure 7:
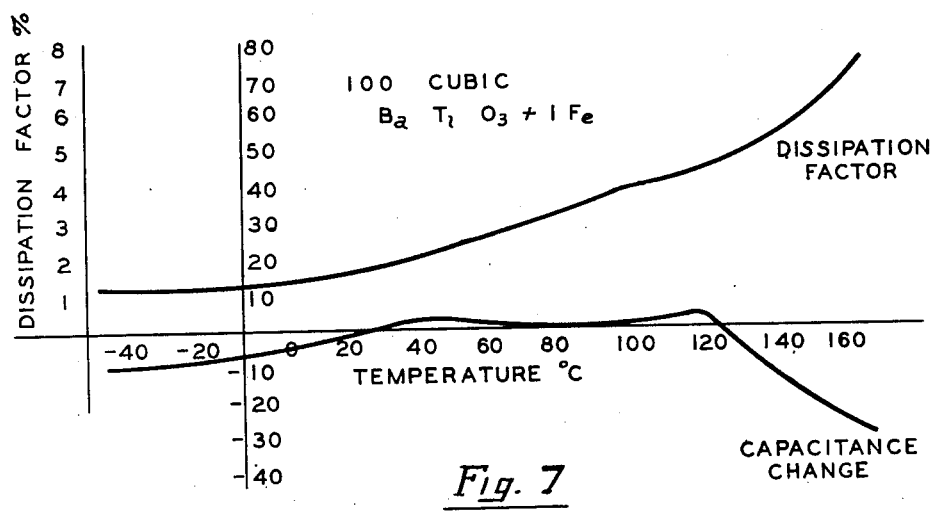
Figure 8:
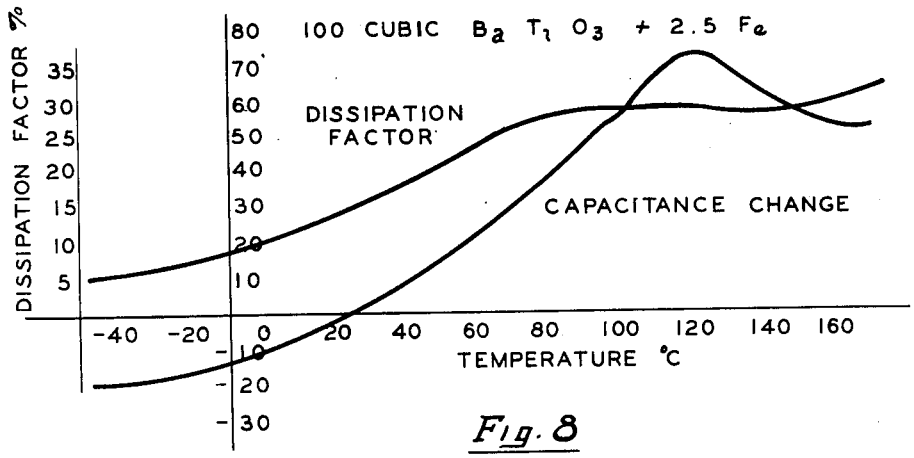
Figure 9:
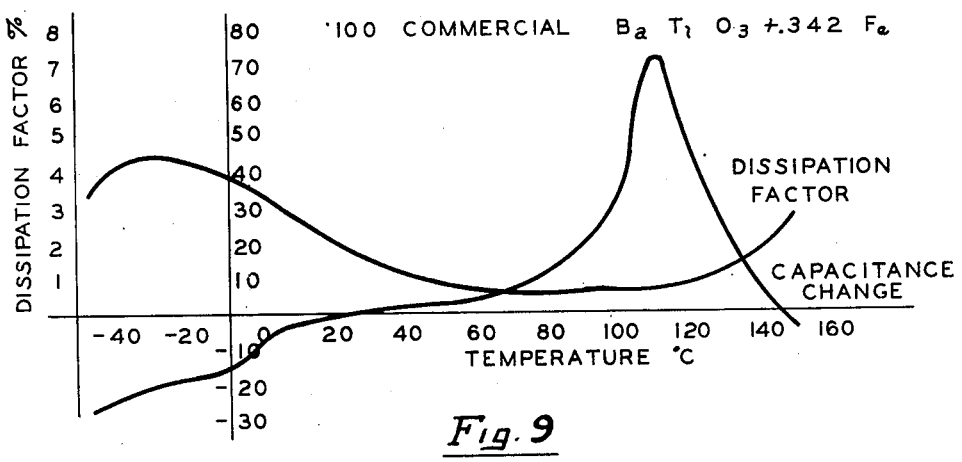

In the drawings, the figures are graphs of the characteristics of barium titanate condensers, Fig. 1 being for commercial barium titanate, Fig. 2 being for cubic barium titanate, Fig. 3 being for 100 parts cubic barium titanate with .1 part iron, Fig. 4 being for 100 parts cubic barium titanate with .25 part iron, Fig. 5 being for 100 parts cubic barium titanate with .342 part iron, Fig. 6 being for 100 parts cubic barium titanate with .75 part iron, Fig. 7 being for 100 parts cubic barium titanate with 1 part iron, Fig. 8 being for 100 parts cubic barium titanate with 2.5 parts iron, and Fig. 9 being for 100 parts commercial barium titanate with .342 part iron.

Fig. 1 shows the typical characteristic curves for condensers made from commercial barium titanate. These condensers show a marked increase in capacity in the region of 120° C. and another less marked increase in capacity at 10° C. with a falling off of capacity at low temperature. The dissipation factor which measures the losses is reasonably good throughout the range from room temperature up, but exhibits a substantial and unwanted increase in the low temperature region. The characteristics of commercial barium titanate are not much changed if the cubic form of barium titanate is used alone. Fig. 2 shows the characteristics of capacitors made from cubic barium titanate.

Figs. 3, 4, 5, 6, 7 and 8 respectively show the characteristics of capacitors made from cubic barium titanate with additions of .1, .25, .342, .75, 1.0 and 2.5 parts iron before firing. The iron is conveniently added in the form of iron oxide ($Fe_2O_3$) and after appropriate mixing and drying operations the mixture is pressed and fired at a temperature on the order of 1350° C. In a typical procedure, the iron oxide is added to the barium titanate in a beaker and stirred with water to get a uniform dispersion. The material is then dried and calcined at 1100° C. for two hours. The calcine is ground lightly in a porcelain mortar and mixed with 2% of an organic binder such as methyl cellulose in water and dried. The dried material is again ground lightly in a porcelain mortar and pressed into discs or plates which are fired in a ceramic kiln at 1350° C. for two hours. The firing temperature of the kiln is not critical. If porosity appears, the firing temperature should be increased.

The addition of $\frac{1}{10}$ part iron to 100 parts of the cubic barium titanate, as shown in Fig. 3, produces a marked reduction in the variation of capacity. There is still the peak in the region of 120° C. and the lesser peak of 10° C. These peaks are, however, smaller. The 120° C. peak has been reduced to 175% of the 25° C. value (a 75% increase in capacity as compared to 25° C.) as distinguished from over 400% (a 300% increase in capacity as compared to 25° C.) in the case of barium titanate alone. Capacitors made from the material shown in Fig. 3 will be essentially constant (plus or minus 5%) in the region minus 50° to plus 98° C. Capacitors made of this material will be slightly piezo-electric.

Another desirable characteristic of the material shown in Fig. 3 is its superior life. On an accelerated life test at a temperature of 85° C. and a voltage gradient of 50 volts per mil, 5 samples exhibited one failure after three hundred hours and no additional failures up to 1000 hours. This compares with capacitors made from barium titanate alone where 4 out of 5 units failed in less than 210 hours.

The material shown in Fig. 4 made by the addition of .25 part iron to 100 parts of cubic barium titanate still further decreases the variation in capacity. The 120° C. peak is now essentially eliminated and the 10° C. peak has completely disappeared. Condensers made of this material will be within plus or minus 5% throughout the range minus 50° C. to plus 130° C. The Fig. 4 material also exhibits the same improved life characteristics of the Fig. 3 material.

Material shown in Fig. 5 which is made by the addition of .342 part iron to 100 parts of cubic barium titanate still further extends the range of essentially constant capacity and retains essentially the same improved life characteristics of the Fig. 3 material. The Fig. 5 material is within plus or minus 5% in the range minus 50° C. to plus 135° C. The material does, however, exhibit higher losses as indicated by the increased dissipation factor as compared with the Fig. 3 and Fig. 4 material.

The effect of increased additions of iron is shown in Figs. 6, 7, and 8. Larger concentration of iron as indicated by these figures does not improve the capacity characteristics and increases the losses. With the addition of 2.5 parts iron the capacity again increases with temperature and the losses become quite high.

The reason why almost minute additions of iron and other materials having bivalent ionic radii in the same range will improve barium titanate capacitor material is not entirely clear. The amounts of iron or equivalent material are too small to allow an explanation due to any chemical phenomenon. Apparently the iron must enter into the structure of the cubic barium titanate in such a manner as to prevent the normal transition to the tetragonal form at the Curie point. This has been confirmed by X-ray diffraction analysis of the cubic barium titanate with added iron. Diffraction studies of this material have indicated that it has a well-defined cubic crystal structure at room temperature. The materials of Figs. 4 to 8 have also been found to be considerably less piezo-electric than pure barium titanate.

Iron is more effective than other materials whose bivalent ionic radii lie in the same range. While the optimum amount of iron is in the range of .25 to .75 part to 100 parts of barium titanate, larger amounts of the other materials may be required, e. g., the optimum amounts of magnesium and nickel are of the order of .3 to 1 part to 100 parts barium titanate.

In all cases, the iron or equivalent additions are in such small amounts that the high dielectric constant of the barium titanate is not decreased or diluted by the interspersed additions in the same manner as porosity lowers the overall or apparent dielectric constant of barium titanate ceramics. A porous barium titanate ceramic, in effect, has air interspersed so the apparent dielectric constant is lowered or diluted.

The effects of the iron or equivalent additions are present when inert additions are made to the barium titanate ceramics. For example, the addition of inert materials such as 4 parts of silica and alumina to 100 parts barium titanate with iron additions changes the characteristics of the resultant material by depressing the dielectric constant in the same manner that would be expected from an increase in porosity where air would be the inert material. That is, once the crystal lattice of barium titanate is modified by the iron or equivalent materials, a barium titanate composition is obtained, which can be used alone or can be diluted by mixing with inert ingredients which have only the effect which would be expected of reducing the effective dielectric constant. The presence of inert materials such as silica and alumina in the cubic barium titanate prior to the addition of iron does not inhibit the effect of iron subsequently added.

The addition of the larger amounts of iron does increase the conductivity of the barium titanate as indicated by the progressively higher losses as the higher percentages of iron are added. The smaller additions may decrease the conductivity according to the mechanism proposed by Johnson and Weyl, Influence of Minor Additions on Color and Electrical Properties of Rutile, Journal of American Ceramic Society, vol. 32, page 398, 1949.

The beneficial effect of iron is obtained only with materials which are in the cubic form at room temperature. Fig. 9 shows the effect of adding .342 part of iron to 100 parts of commercial barium titanate which is tetragonal at room temperature. This material exhibits the peak in the region of 120° C. and the high losses at low temperatures characteristic of pure barium titanate. This material is within plus or minus 5% of its normal capacity from 5° C. to 63° C. This compares with a condenser made of cubic barium titanate and the same addition of iron which has a capacity constant to within ±5% from the range minus 50° C. to plus 135° C. Furthermore, the commercial barium titanate exhibits piezoelectric properties when polarized which are markedly reduced when the same amount of iron is introduced into the cubic barium titanate.

The term "cubic barium titanate" is used to designate barium titanate whose crystal structure is essentially cubic at room temperature or below the Curie point. One way of preparing "cubic barium titanate" is disclosed in application Serial No. 330,584, filed January 9, 1953. Cubic barium titanate, upon firing in the absence of iron or equivalent additions, changes to a crystal structure which is tetragonal at room temperature. This is a permanent change and thereafter the addition of iron or equivalent materials to the tetragonal barium titanate produces an effect similar to commercial barium titanate and not the effect obtained with cubic barium titanate.

The purity of cubic barium titanate is not the decisive factor. Iron could be considered as an impurity which is sometimes present in tetragonal barium titanate. The effect of addition of iron to cubic barium titanate is to prevent the change to the tetragonal crystal form and once the change to the tetragonal crystal form has been made, the change is permanent and cannot be reversed. For example, after the cubic barium titanate has been fired, it is too late to add the iron or equivalent material.

This application is a continuation-in-part of application Serial No. 213,090, filed February 28, 1951, now abandoned.

What is claimed as new is:

1. A barium titanate ceramic dielectric having a cubic crystal structure as determined by X-ray diffraction below the Curie point in which the crystal lattice of the ceramic contains ions of from .1% to 2½% by weight of metals whose bivalent ionic radii are in the range of from .6 to 1.0 Angstrom unit and whose bivalent ionic potentials are in the range of from 1.4 to 1.8.

2. A barium titanate ceramic dielectric having a cubic crystal structure as determined by X-ray diffraction below the Curie point in which the crystal lattice of the ceramic contains ions of from .1% to 2½% by weight of metals selected from the group consisting of iron, nickel, cobalt, magnesium, calcium and manganese.

3. A barium titanate ceramic dielectric having a cubic crystal structure as determined by X-ray diffraction below the Curie point in which the crystal lattice of the ceramic contains ions of from .1% to 2½% by weight of iron.

4. A barium titanate ceramic dielectric having a cubic crystal structure as determined by X-ray diffraction below the Curie point in which the crystal lattice of the ceramic contains ions of from .1% to 2½% by weight of nickel.

5. A barium titanate ceramic dielectric having a cubic crystal structure as determined by X-ray diffraction below the Curie point in which the crystal lattice of the ceramic contains ions of from .1% to 2½% by weight of magnesium.

6. A barium titanate ceramic dielectric comprising a crystal lattice of 100 parts by weight barium titanate having a cubic crystal structure as determined by X-ray diffraction below the Curie point combined with ions of from .1 to 1 part by weight of iron.

7. A barium titanate ceramic dielectric comprising a crystal lattice of 100 parts by weight barium titanate having a cubic crystal structure as determined by X-ray diffraction below the Curie point combined with ions of from .25 to .75 part by weight of iron.

8. A barium titanate ceramic dielectric comprising a crystal lattice of 100 parts by weight barium titanate having a cubic crystal structure as determined by X-ray diffraction below the Curie point combined with ions of from .3 to 1 part by weight of nickel.

9. A barium titanate ceramic dielectric comprising a crystal lattice of 100 parts by weight barium titanate having a cubic crystal structure as determined by X-ray diffraction below the Curie point combined with ions of from .3 to 1 part by weight of magnesium.

10. A barium titanate ceramic dielectric comprising a crystal lattice of barium titanate having a cubic crystal structure as determined by X-ray diffraction below the Curie point combined with $Fe_2O_3$, the weight of the iron in the $Fe_2O_3$ being in the range of .1 to 1% of the weight of the barium titanate.

11. A barium titanate ceramic dielectric comprising a crystal lattice of barium titanate having a cubic crystal structure as determined by X-ray diffraction below the Curie point combined with ions of from .1% to 2½% by weight of metal selected from the group consisting of iron, nickel, cobalt, magnesium, calcium and manganese.

References Cited in the file of this patent

UNITED STATES PATENTS

| Number | Name | Date |
| --- | --- | --- |
| 2,377,910 | Wainer et al. | June 12, 1945 |
| 2,402,515 | Wainer | June 18, 1946 |
| 2,402,516 | Wainer | June 18, 1946 |
| 2,429,588 | Thurnauer et al. | Oct. 21, 1947 |
| 2,452,532 | Wainer | Oct. 26, 1948 |
| 2,533,140 | Rodriguez | Dec. 5, 1950 |
| 2,576,378 | Woodcock et al. | Nov. 27, 1951 |
| 2,576,379 | Woodcock et al. | Nov. 27, 1951 |